2,964,797

WRAPPING FOILS OF HIGH MOLECULAR THERMOPLASTIC POLYCARBONATES

Günter Peilstöcker and Wilhelm Hechelhammer, Krefeld-Bockum, Germany, assignors to Farbenfabriken Bayer Aktiengesellschaft, Leverkusen, Germany, a corporation of Germany No Drawing. Filed May 14, 1957, Ser. No. 658,933

Claims priority, application Germany May 17, 1956

3 Claims. (Cl. 18—57)

Wrapping foils of thermoplastics for example those made of polyethylene, polyamide or polyethylene terephthalate have been known for a long time.

Polyethylene foils have a tensile strength and shock resistance sufficiently high to be used for many purposes, and also a high folding strength. They are capable of being welded, are comparatively poorly permeable to water vapor and have a good hand. The polyethylene foils are, however, not transparent, scarcely resistant to tropical conditions and not resistant to sterilizing; they do not exhibit a good resistance to permanent heat and are not altogether repellent to coloring matter.

Polyamide foils compared with polyethylene foils exhibit in addition to an improved shock resistance, high folding strength and a good welding capability, a good resistance to permanent heat, but are more water-absorbent and to a certain degree pervious to water vapor and only very little resistant to mineral acids. They are not particularly transparent. They are to some extent transparent only when rather thin, but they are readily stained due to their basic character.

Polyethylene terephthalate foils orientated by stretching also have a good resistance to permanent heat together with a comparatively good transparency and high tensile strength. They have, however, a tendency to recrystallisation when subjected to elevated temperatures and thus to a deterioration in their mechanical properties. They can be welded only with great difficulty by conventional welding processes.

It has now been found that wrapping foils of high molecular weight thermoplastic polycarbonates are not only equal to the wrapping foils hitherto used in practice in all their properties, but definitely superior with regard to the following properties.

Foils of such polycarbonates have a very high resistance to permanent heat in the stretched or non-stretched state, complete transparency, very slight water-absorption, and are thus little permeable to water vapors, they have a high resistance to ageing, fastness to mineral acids even of high concentrations, resistance to water and sterilization, elasticity and resistance to shock, satisfactory welding properties, smell-resistance, provided the aromatic substances do not contain volatile materials which swell or dissolve the polycarbonate. The polycarbonates are, moreover, physiologically harmless and completely stain-repellent and do not contain any plasticizers. Polycarbonate foils are suitable inter alia for wrapping foodstuffs and similar commodities, textiles, chemicals, drugs, commodities of all types and of technical parts.

High molecular weight thermoplastic polycarbonates according to the invention may be produced of a great number of dihydroxy compounds, that is of aliphatic, cycloaliphatic and aromatic dihydroxy compounds. For example there may be mentioned:

As aliphatic dihydroxy compounds: ethylene glycol, diethylene glycol, triethylene glycol, polyethylene glycol, thiodiglycol, ethylene dithiodiglycol, the di-, and polyglycols produced from propyleneoxide-1,2, o, m, or p-xylylene glycol, propanediol-1,3, butanediol-1,3, butanediol-1,4, 2-methylpropanediol-1,3, pentanediol-1,5, 2-ethylpropanediol-1,3, hexanediol-1,6, octanediol-1,8, 1-ethylhexanediol-1,3 and decanediol-1,10;

As cycloaliphatic dihydroxy compounds: cyclohexanediol-1,4, cyclohexanediol-1,2, 2,2-(4,4'-dihydroxy-dicyclohexylen)-propane and 2,6-dihydroxydecahydronaphthalene;

As aromatic dihydroxy compounds: hydroquinone, resorcinol, pyrocatechol, 4,4'-dihydroxydiphenyl, 2,2'-dihydroxydiphenyl, 1,4-dihydroxynaphthalene, 1,6-dihydroxynaphthalene, 2,6-dihydroxynaphthalene, 1,2-dihydroxynaphthalene, 1,5-dihydroxynaphthalene, dihydroxyanthracene, 2,2'-dihydroxydinaphthyl-1,1' and o, m, p-hydroxybenzylalcohol.

Preferred classes of aromatic dihydroxy compounds are the di-monohydroxy arylene sulphones and particularly the di-monohydroxyarylene alkanes, such as 4,4'-dihydroxydiphenylene sulphone,
2,2-dihydroxydiphenylene sulphone,
3,3'-dihydroxydiphenylene sulphone,
4,4'-dihydroxy-2,2'-dimethyl-diphenylene sulphone,
4,4'-dihydroxy-3,3'-dimethyl-diphenylene sulphone,
2,2'-dihydroxy-4,4'-dimethyldiphenylene sulphone,
4,4'-dihydroxy-2,2'-diethyldiphenylene sulphone,
4,4'-dihydroxy-3,3'-diethyldiphenylene sulphone,
4,4'-dihydroxy-2,2'-di-tert.butyl-diphenylene sulphone,
4,4'-dihydroxy-3,3'-di-tert.butyl-diphenylene sulphone and
2,2'-dihydroxy-1,1'-dinaphthylene sulphone;
Furthermore
4,4'-dihydroxy-diphenylene-methane,
1,1-(4,4'-dihydroxy-diphenylene)-ethane,
1,1-(4,4'-dihydroxy-diphenylene)-propane,
1,1-(4,4'-dihydroxy-diphenylene)-butane,
1,1-(4,4'-dihydroxy-diphenylene)-2-methyl-propane,
1,1-(4,4'-dihydroxy-diphenylene)-heptane,
1,1-(4,4'-dihydroxy-diphenylene)-1-phenyl-methane,
(4,4' - dihydroxy - diphenylene) - (4 - methyl - phenylene)-methane,
(4,4' - dihydroxy - diphenylene) - (4 - ethyl - phenylene)-methane,
(4,4' - dhydroxy - diphenylene) - (4 - isopropyl - phenylene)-methane,
(4,4' - dihydroxy - diphenylene) - (4 - butyl - phenylene)-methane,
(4,4'-dihydroxy-diphenylene)-benzyl-methane,
(4,4'-dihydroxy-diphenylene)-α-furyl-methane
2,2-(4,4'-dihydroxy-diphenylene)-propane,
2,2-(4,4'-dihydroxy-diphenylene)-butane,
2,2-(4,4'-dihydroxy-diphenylene)-pentane (melting point 149–150° C.),
2,2-(4,4'-dihydroxy-diphenylene)-4-methyl-pentane,
2,2-(4,4'-dihydroxy-diphenylene)-heptane (boiling point 198–200° C. under 0.3 mm. mercury gauge),
2,2-(4,4'-dihydroxy-diphenylene)-octane,
2,2-(4,4'-dihydroxydiphenylene)-nonane (melting point 68° C.),
1,1-(4,4'-dihydroxy-diphenylene)-1-phenyl-ethane,
(4,4'-dihydroxy-diphenylene)-1-(α-furyl)-ethane,
3,3-(4,4'-dihydroxy-diphenylene)-pentane,
4,4-(4,4'-dihydroxy-diphenylene)-heptane,
1,1-(4,4'-dihydroxy-diphenylene)-cyclopentane,
1,1-(4,4'-dihydroxy-diphenylene)-cyclohexane,
2,2 - (4,4' - dihydroxy - diphenylene) - dekahydronaphthalene (melting point 181° C.),
2,2 - (4,4' - dihydroxy - 3,3' - dicyclohexyl - diphenylene)-propane (melting point 144–146° C.),
2,2 - (4,4' - dihydroxy - 3 - methyl - diphenylene) - propane (melting point 114° C.),
2,2-(4,4'-dihydroxy-3-isopropyl-diphenylene)-butane, 1,1 - (4,4' - dihydroxy - 3,3' - dimethyl - diphenylene) - cyclohexane, 2,2 - (4,4' - dihydroxy - 3,3' - dibutyl - diphenylene) - propane, 2,2 - (4,4' - dihydroxy - 3,3' - diphenyl - diphenylene) - propane, 2,2 - (4,4' - dihydroxy - 2,2' - dimethyl - diphenylene-propane, 1,1 - (4,4' - dihydroxy - 3,3' - dimethyl - 6,6' - dibutyl-diphenylene)-butane, 1,1 - (4,4' - dihydroxy - 3,3' - dimethyl - 6,6' - di-tert.butyl-diphenylene)-ethane, 1,1 - (4,4' - dihydroxy - 3,3' - dimethyl - 6,6' - di-tert.butyl-diphenylene)-propane, 1,1 - (4,4' - dihydroxy - 3,3' - dimethyl - 6,6' - di-tert.butyl-diphenylene)-butane, 1,1 - (4,4' - dihydroxy - 3,3' - dimethyl - 6,6' - di-tert.butyl-diphenylene)-isobutane, 1,1 - (4,4' - dihydroxy - 3,3' - dimethyl - 6,6' - di-tert.butyl-diphenylene)-heptane, 1,1 - (4,4' - dihydroxy - 3,3' - dimethyl - 6,6' - di-tert.butyl-diphenylene)-1-phenyl-methane, 1,1 - (4,4' - dihydroxy - 3,3' - dimethyl - 6,6' - di-tert.butyl-diphenylene)-2-methyl-2-pentane, 1,1 - (4,4' - dihydroxy - 3,3' - dimethyl - 6,6' - di-tert.butyl-diphenylene)-2-ethyl-2-hexane, and 1,1 - (4,4' - dihydroxy) - 3,3' - dimethyl - 6,6' - di-tert.amyl-diphenylene)-butane.

Among the great number of suitable di-monohydroxy arylene alkanes the 4,4'-dihydroxy-diphenylene alkanes are preferred, especially the 2,2-(4,4'-dihydroxy-diphenylene)-propane and the 1,1-(4,4'-dihydroxy-diphenylene)-cyclohexane.

In some cases mixed polycarbonates prepared of at least two different dihydroxy compounds, especially such of at least one aromatic and at least one aliphatic dihydroxy compound, yield foils with special properties.

In general it is advantageous that the polycarbonates have a relatively high molecular weight, they should have a K-value of at least 50 measured in a 0.5 percent solution in methylene chloride, especially a value from about 50 to about 65.

The high molecular weight thermoplastic polycarbonates may be produced by re-esterifying a dihydroxy compound of one of the groups mentioned above or a mixture of such dihydroxy compounds with a di-ester of carbonic acid, e.g. with the dimethyl-, diethyl-, dipropyl-, dibutyl-, diamyl-, dioctyl-, dicyclohexyl-, and especially with the diphenyl- and di-o, m, or p-toluyl carbonate, or with mixed esters, for instance with the methyl-ethyl, the methyl-propyl, the ethyl-propyl, the methyl-cyclohexyl, the ethyl-cyclohexyl, the propyl-cyclohexyl, the methyl-phenyl, the ethyl-phenyl, the propyl-phenyl, the ethyl-o-, m- or p-toluyl and the cyclohexyl-phenyl carbonate, particularly at elevated temperatures from about 50–330° C. and especially from about 120 to about 290° C. and under reduced pressure for instance up to 0.1 mm. mercury gauge.

By re-esterifying the mentioned carbonic acid diesters, the corresponding alkyl or cycloalkyl alcohols or the corresponding phenols are split off.

As di-esters of carbonic acid there also may be used dialkyl-, dicycloalkyl- or diaryl-dicarbonates of aromatic dihydroxy compounds, especially of di-monohydroxy arylene alkanes. Such mixed bis-carbonates of dihydroxy compounds may be heated alone while the corresponding carbonic acid diester splits off. They also may be heated in mixture with dihydroxy compounds referred to.

The aforementioned dicarbonates of the aromatic dihydroxy compounds are easily obtainable e.g. by reacting the sodium salt of the aromatic dihydroxy compounds with 2 moles of an alkyl-, cycloalkyl-, or aryl-chlorocarbonate. Thus for example one obtains by reacting the sodium salt of 2,2-(4,4'-dihydroxy-diphenylene)-propane with phenyl chlorocarbonate in aqueous alkali medium, the bisphenyl carbonate of 2,2-di-(p-hydroxyphenylene)-propane, having the melting point 102–104° C. in practically quantitative yield.

For carrying out the process the following carbonates of aromatic dihydroxy compounds are suitable: bis-alkyl, e.g. bis-ethyl, bis-propyl, bis-isopropyl, bis-butyl, bis-amyl, bis-hexyl, bis-cycloalkyl, e.g. bis-cyclohexyl and bis-methylcyclohexyl, and bis-aryl, e.g. bis-phenyl, bis-cresyl, bis-cyclohexylphenyl and bis-naphthyl carbonates of resorcinol, hydroquinone, 2,4-dihydroxytoluene, 2,5-dihydroxytoluene, 3,5-dihydroxytoluene, 4,4'-dihydroxydiphenyl, 2,4'-dihydroxydiphenyl, 4,4'-dihydroxy-3-cyclohexyl-diphenyl, 1,4-dihydroxynaphthalene, 1,6-dihydroxynaphthalene, 2,6-dihydroxynaphthalene, 1,5-dihydroxyanthracene and of di-(mono-hydroxyarylene)-alkanes, in particular the 2,2-[diphenyl-(diphenylene)-dicarbonate]-propane. Mixtures of bis-carbonates of the dimonohydroxyarylene alkanes with monohydroxy compounds can also be used.

By heating these bis-alkyl, -cycloalkyl, or -aryl carbonates of the aromatic dihydroxy compounds, preferably under reduced pressure, one obtains, with separation of neutral alkyl, cycloalkyl, or aryl carbonates, a high molecular weight polycarbonate. If the said compounds are mixed with a dihydroxy compound, high molecular weight polycarbonates are obtained by inter-esterification. If, for example, one mole of the bis-phenyl carbonate of 2,2-di-(p-hydroxyphenylene)-propane is inter-esterified with one mole of 2,2-di-(p-hydroxyphenylene)-propane itself, the polycarbonate of the 2,2-di-(p-hydroxyphenylene)-propane is obtained accompanied by separation of phenyl. This process has the advantage that the quantity of phenol split off per unit weight of polycarbonate formed is less than in other inter-esterification processes.

The re-esterifying process has to be conducted while excluding oxygen. We prefer to pass an inert-gas such as hydrogen, nitrogen, or carbon dioxide gas through the melt.

The re-esterification may be activated by re-esterifying catalysts, such as inorganic bases, for example caustic soda and potassium hydroxide, high boiling organic bases, such as acridine, metal hydrides, such as lithium and calcium hydride, alkali or alkaline earth metals, such as sodium, potassium, magnesium, and calcium, metal oxides, such as zinc oxide, aluminium oxide, lead oxide, antimonotrioxide, cerium oxide, and boron oxide, acids, such as phosphoric acid and p-toluene sulphonic acid, and salts, such as sodium benzoate, calcium acetate, and boron phosphate, and alcoholates and phenolates.

When using basic catalysts mentioned above in the re-esterifying process it is advantageous to neutralise these basic catalysts towards the end of the esterification by adding base-binding materials to the melt. For this purpose a large variety of base-binding organic or inorganic substances can be added e.g. aromatic sulphonic acids such as p-tolyl sulphonic acid, organic acid halides such as stearyl chloride, butyryl chloride, benzoyl chloride, and toluene sulphochloride, organic chlorocarbonates such as phenyl chloroformate, p-hydroxy-diphenyl chloroformate, and bis-chloroformates of di-monohydroxy arylene alkanes, dialkylsulphates such as dimethyl sulphate and dibutyl sulphate, organic chlorine compounds such as benzoyl chloride and ω-chloroacetophenone as well as acid salts of polycondensation inorganic acids such as ammonium hydrogen sulphate.

Base-binding substances which are volatile under greatly reduced pressure at esterification temperatures are especially suitable since an incidental excess over that required to neutralise the basic catalysts can be easily removed from the melt. Dimethyl sulphate, phenylchloroformate and benzoyl chloride are examples of substances of this group.

After the neutralization of the catalysts, the inter-esterification can if necessary be further continued to a limited extent for the attainment of a desired molecular weight.

The polycarbonates can also be produced by introducing phosgene into solutions of dihydroxy compounds or of mixtures of the aforesaid dihydroxy compounds in organic bases, such as dimethylaniline, diethylaniline, trimethylamine, and pyridine, or in indifferent organic solvents, such as petrol, ligroin, cyclohexane, methylcyclohexane, benzene, toluene, xylene, chloroform, methylenechloride, carbon tetrachloride, trichloroethylene, di-chloroethane, methylacetate, and ethylacetate, with addition of an acid-binding agent, e.g. tertiary amines.

A process particularly suitable for producing polycarbonates consists in introducing phosgene into the aqueous solution or suspension of alkali or alkaline earth metal salts, such as lithium, sodium, potassium, and calcium salts of the dihydroxy compounds, preferably in the presence of an excess of a base, such as lithium, sodium, potassium, and calcium hydroxide or carbonate. The polycarbonate then precipitates out from the aqueous solution.

The conversion in the aqueous solution is promoted by the addition of reaction inert solvents of the kind mentioned above which are capable of dissolving phosgene and eventually the produced polycarbonate.

The reaction conditions should be so that one mole of the phosgene reacts with one mole of the dihydroxy compounds. Suitable temperatures are from about 0° C. to 100° C.

Finally it is also possible to react bis-chloro-carbonates of dihydroxy compounds, with the aforementioned dihydroxy compounds. The condensation proceeds suitably in the presence of inert solvents, and acid-binding materials, e.g. tertiary amines.

When using phosgene or bis-chlorocarbonic acid esters as derivatives of the carbonic acid in producing polycarbonates catalysts also may be advantageous. Such catalysts are for instance tertiary or quaternary organic bases or salts thereof, such as trimethylamine, triethylamine, dimethylaniline, diethylaniline, dimethylcyclohexylamine, and pyridine, or for instance the corresponding hydrochlorides, and tetramethylammoniumhydroxide, triethyloctadecylammoniumchloride, trimethylbenzylammoniumfluoride, triethyl-benzylammoniumchloride, dimethyldodecylammoniumchloride, dimethylbenzylphenylammoniumchloride, trimethylcyclohexylammoniumbromide, and N-methylpyridiniumchloride, in amounts from about 0.05 to about 5 percent by weight. These compounds may be added to the reaction mixture before or during the reaction.

Furthermore in some of these cases we prefer to add surface active agents, such as alkali metal salts of higher fatty acids or of sulphonic acids of higher aliphatic or of aromatic hydrocarbons and polyoxyethylated alcohols and phenols. Greater amounts of the quaternary ammonium bases mentioned above, too, act as such surface active agents.

In the production of polycarbonates according to the various processes it further is advantageous to employ small amounts of reducing agents, for example sodium or potassium sulphide, sulphite, and dithionite, or free phenol and p-tert.butyl-phenol.

By adding monofunctional compounds which are capable of reacting with phosgene or with the end groups of the polycarbonates consisting of the chlorocarbonic acid ester group and which terminate the chains, such as phenols, for instance, the phenol, the tert.butylphenol, the cyclohexylphenol, and 2,2-(4,4-hydroxyphenylene-4'-methoxyphenylene)-propane further aniline and methylaniline, it is possible to regulate the molecular weight of the polycarbonates in wide limits.

Typical processes for preparing high molecular weight polycarbonates mentioned above are described in the following examples; the parts are by weight.

Example 1

A mixture of
45.6 parts of 2,2-di-(p-hydroxyphenylene)-propane
47.1 parts of diphenylcarbonate and
0.008 part of lithium hydride is melted together under a nitrogen atmosphere with stirring at 110–150° C. The phenol which separates is distilled off by further heating to 210° C. under a pressure of 20 mms. mercury gauge. The pressure is then reduced to 0.2 mm. mercury gauge and the temperature raised for one hour to 250° C., and for two further hours to 280° C. At the end of the condensation the catalyst is neutralized by stirring 0.05 part of dimethyl sulphate into the melt. The excess of neutralizing agent is finally removed by further heating under reduced pressure. A viscous melt is obtained which solidifies to a thermoplastic material melting at 240° C.

Example 2

A mixture of 46.8 parts of bis-(phenylcarbonate) of 2,2-di-(p-hydroxyphenylene)-propane, 0.008 part of calcium hydride and 0.008 part of sodium benzoate is melted together under nitrogen and with stirring. The diphenyl carbonate split off is distilled off at 200° C. under a pressure of 2 mms. mercury gauge. After further heating to 280° C. at a pressure of 0.2 mm. mercury gauge the alkali catalyst is neutralized by stirring in 0.05 part of dimethyl sulphate. The mixture is then stirred for a further half an hour at 280° C. at 0.2 mm. mercury gauge pressure, whereby the excess of dimethyl sulphate is removed and a colorless high molecular weight thermoplastic polycarbonate is obtained which softens at about 230° C.

Example 3

Into a mixture of 137.6 parts of 2,2-(4,4'-dihydroxydiphenylene)-propane, 66.9 parts of caustic soda, 615 parts of water, 330 parts of methylenechloride, 0.12 part of sodium dithionite, and 0.1 part of p-tert.butylphenol, 71.5 parts of phosgene are introduced with stirring at about 25° C. during two hours. Then 3 parts of triethylbenzylammoniumchloride are added while continuing stirring the mixture at room temperature for about 2 hours. After this time the solution of the polycarbonate in the methylenechloride is highly viscous. After washing the mixture with water and evaporating the solvent a colorless, elastic plastic material is obtained. The K-value is 63.0 corresponding to an average molecular weight of 45,000. The theoretical average molecular weight is 47,700.

Example 4

To a mixture of 19.65 parts of 1,1-(4,4'-dihydroxydiphenylene)-cyclohexane-bis-chlorocarbonic acid ester and 12.86 parts of 1,1-(4,4'-dihydroxy-diphenylene)-cyclohexane dissolved in 350 parts of methylene chloride there is added drop by drop with stirring a solution of 11.85 parts of pyridine in 55 parts of methylene chloride at 0° C. over a period of 60 minutes. After the mixture is stirred at room temperature for several hours it is shaken out with water and dried. After evaporation of the solvent there remains a colorless clear tough plastic material with a softening point of 180° C.

Further special examples for producing high molecular weight thermoplastic polycarbonates are given in our copending applications Serial Nos. 461,938, 557,256, 572,793, 572,802, 596,398 and 614,340.

The foils suitable for wrapping according to the invention may be produced by methods known in the art per se. The polycarbonate may be melted and the melt may be blown or cast to the foils e.g. by means of an extruder with a wide-slit nozzle or the polycarbonate may be dissolved in an organic solvent, this solution being cast to foils.

However for the present invention it is essential that the polycarbonate is dried to an extremely high extent before being worked up. It should have a water content not higher than about 0.05 percent. Therefore it is preferable to preheat the polycarbonate for instance in the form of a granulate for some hours at temperatures between about 80 and about 120° C. in a gas stream or under reduced pressure, particularly lower than one millimeter mercury gauge.

When casting the foils from the melt for example by means of an extruder it is furthermore advantageous to produce a relatively high pressure upon the melt, so that the gas-bubbles eventually risen in the melt are pressed out. Thus the pressure upon the melt before the nozzle should be at least 50 atmospheres. In general suitable pressures lie between about 70 and about 150 atmospheres.

When casting the foils from a polycarbonate solution the process should be carried out in an atmosphere as dry as possible to prevent the foils from becoming opaque.

The following examples are given for the purpose of illustrating the invention.

*Example 5*

Foils cast from a solution of poly-2,2-(4,4'-diphenylene)-propane carbonate of K-value 52, with a water content of 0.03 percent in absolute methylenechloride by the method known in the art per se, are suitable for wrapping foodstuffs and similar commodities such as meat and sausages, sugar, flour products such as noodles and the like, bread, cake etc., tea, coffee, cocoa, confectionery such as chocolate, sweets or biscuits, and also tobacco merchandise. They are also suitable for the manufacture of protective covers and coverings for objects of daily use such as dresses, coats, fabrics or shoes.

*Example 6*

Tubular foils are produced from poly-2,2-(4,4'-diphenylene)-propane carbonate of K-value 58 with a water content of 0.02 percent by the blowing process known in the art per se. These foils are suitable especially for wrapping foodstuffs and similar articles such as meat and sausages, sweets, spices, noodles and the like and tobacco goods. They may also be used for wrapping textiles, chemicals, drugs, commodities of all types and small technical parts.

The foils obtained from polycarbonates indicate in the above examples have in the unstretched state a tensile strength of 815 kilograms per square centimetre, an elongation of 180 percent and a shock-resistance of 1153 kilograms per square centimetre, and in the stretched state a tensile strength of 1400 to 1700 kilograms per square centimetre and an elongation of 32 to 40 percent.

The foils do not change their physical properties in the unstretched state up to temperatures of 160° C.

*Example 7*

Extruded foils of poly-2,2-(4,4'-diphenylene)-propane carbonate of K-value 56 with a water content of 0.02 percent are produced from the melt through a wide-slit nozzle of the desired flat width and thickness, preferably having a width of 10–100 centimetres and a thickness of 0.01 to 0.5 millimeter. The pressure upon the melt in the extruder before the nozzle is about 90 atmospheres.

These foils are especially suitable for wrapping foodstuff and similar commodities such as sausages, noodles, and the like, and tobacco goods. They may also be used for wrapping textiles, chemicals, drugs, commodities of all types and technical small parts.

We claim:
1. A process for manufacturing easily welded, transparent foils that are highly impermeable to water vapor, which process is characterized by the steps of melting a high molecular weight thermoplastic film and fiber forming poly-(di-monohydroxyarylene alkane carbonate) having a water content not higher than 0.05%, and extruding the melt through a foil-forming nozzle under a pressure of at least 50 atmospheres.

2. A process for manufacturing easily welded transparent foils that are highly impermeable to water vapor, which process is characterized by the steps of providing a high molecular weight thermoplastic film and fiber forming poly-(di-monohydroxyarylene alkane carbonate) resin in liquid condition, shaping the liquid into generally the form of the desired foil, and converting the shaped mass into solid resin, all the steps being carried out while the moisture content of the resin is maintained no higher than 0.05%.

3. A process according to claim 2 in which the liquid is a solution of the resin in a volatile solvent.

References Cited in the file of this patent

UNITED STATES PATENTS

| | | |
|---|---|---|
| 2,590,186 | Land | Mar. 25, 1952 |
| 2,718,666 | Knox | Sept. 27, 1955 |
| 2,789,966 | Reynolds et al. | Apr. 23, 1957 |
| 2,789,970 | Reynolds et al. | Apr. 23, 1957 |
| 2,799,667 | Drewitt et al. | July 16, 1957 |

FOREIGN PATENTS

| | | |
|---|---|---|
| 532,543 | Belgium | Oct. 30, 1954 |

OTHER REFERENCES

Schnell: Angew. Chemie, 68, 633–640, October 1956.